(12) United States Patent
Liang et al.

(10) Patent No.: US 11,422,011 B2
(45) Date of Patent: Aug. 23, 2022

(54) COMPOSITE MATERIAL OPTICAL FIBER ARRAY FOR AUTOMATICALLY IDENTIFYING STRUCTURAL DAMAGE ONLINE

(71) Applicant: QINGDAO UNIVERSITY OF TECHNOLOGY, Shandong (CN)

(72) Inventors: Sen Liang, Qingdao (CN); Yunpeng Yan, Qingdao (CN); Guanghe Wang, Qingdao (CN); Gongxian Yang, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 201 days.

(21) Appl. No.: 17/019,950

(22) Filed: Sep. 14, 2020

(65) Prior Publication Data
US 2021/0164811 A1   Jun. 3, 2021

(30) Foreign Application Priority Data
Nov. 28, 2019 (CN) .......................... 201911191118.6

(51) Int. Cl.
*G01D 5/353* (2006.01)
*G02B 6/35* (2006.01)
*G02B 26/08* (2006.01)

(52) U.S. Cl.
CPC ....... *G01D 5/35341* (2013.01); *G02B 6/3518* (2013.01); *G02B 6/3598* (2013.01); *G02B 26/0841* (2013.01)

(58) Field of Classification Search
CPC ...................................... G01D 5/35341–35351
See application file for complete search history.

(56) References Cited

U.S. PATENT DOCUMENTS

| | | | | |
|---|---|---|---|---|
| 5,015,842 A * | 5/1991 | Fradenburgh | ........ | G08B 13/126 250/227.15 |
| 7,630,591 B2 * | 12/2009 | Allen | ................... | D03D 15/292 250/227.16 |
| 8,003,932 B2 * | 8/2011 | Sikora | ................ | G01M 11/3145 385/32 |
| 9,709,459 B1 * | 7/2017 | Guthrie | ................ | G01M 11/085 |
| 2021/0164811 A1 * | 6/2021 | Liang | ................ | G02B 26/0841 |

* cited by examiner

*Primary Examiner* — Tina M Wong
(74) *Attorney, Agent, or Firm* — Oliff PLC

(57) ABSTRACT

Two photoelectric circuit sets each have a light source, two light switches, optical fibers, photoelectric sensor and computer. The light source emits visible light to the first switch, which is continuously deflected and reflected by a torsional micro-mirror. The light respectively irradiates each of the optical fibers in a composite material optical fiber prepreg layer. If the material is normal, the optical fiber is not damaged, the visible light passes through the optical fiber and irradiates the second switch, and is continuously deflected and reflected by a second torsional micro-mirror, the light irradiates the photoelectric sensor. The sensor outputs an electric signal to the computer. If the material is damaged, the optical fiber here is damaged, another corresponding optical fiber path at an intersection point is also damaged without electric signal output. The computer gives breaking position coordinates at the intersection point of two paths of optical fiber arrays.

7 Claims, 5 Drawing Sheets

COMPOSITE MATERIAL OPTICAL FIBER ARRAY FOR AUTOMATICALLY IDENTIFYING STRUCTURAL DAMAGE ONLINE

BACKGROUND

Technical Field

The present invention belongs to the field of non-destructive online damage detection of structural materials, can automatically detect and identify a damage position and the size of a wound online, and specifically relates to a composite material optical fiber array for automatically identifying structural damage online.

Related Art

With the development of science and technology, China's large aircraft, manned spacecraft, deep-sea detectors and other equipment have made great breakthroughs. The external working environments of these high-tech equipment are harsh, and the equipment often endures very complicated external forces and is easily damaged. In order to successfully complete tasks, an optical fiber array for automatically identifying material damage online is needed.

At present, in order to maintain the equipment and ensure the normal work of the equipment, logistics personnel need to perform non-destructive flaw detection regularly. Common non-destructive flaw detection methods include: X-ray flaw detection, ultrasonic flaw detection, magnetic powder flaw detection, permeation flaw detection, eddy current flaw detection, and γ-ray flaw detection, etc. These non-destructive flaw detection methods are only performed after the equipment has run for a long time, it is impossible to find equipment damage in a complicated environment immediately, and it is not known in advance where the damage is, so that it is necessary to detect the entire surface. It takes a lot of time and effort to realize large-area manual detection of the equipment. If there is no special condition after passing the detection, the equipment should work until the next detection and maintenance time point. Working in the complicated environment, the equipment may be damaged at any time, and the damage degree of the structure cannot be found in time, which will cause great harm to the personnel and equipment.

SUMMARY

In view of the above problems, the present invention provides a device for automatically detecting and identifying a damage position and the size of a wound online, and an optical fiber array for automatically identifying damage online, which is installed on a structural material surface. By using the method provided by the present invention, real-time non-destructive flaw detection can be performed on the surface material of the equipment during running of the equipment, and the operation is convenient, stable and rapid.

A technical solution used by the present invention is as follows:

An optical fiber array for automatically identifying structural material damage online, including:

a composite material optical fiber network composed of an optical fiber array. The optical fiber array is made into a very thin optical fiber composite material prepreg through black resin to be cured and pasted at a detection position or embedded in a composite material. Optical fibers can transmit light and are easily broken when encountering external forces. The optical fibers are distributed in a grid shape and are divided into X and Y directions perpendicular (or oblique) to each other. All of the optical fibers in the X direction are parallel. All of the optical fibers in the Y direction are perpendicular or (oblique) to all of the optical fibers in the X direction. The X direction and the Y direction of the composite material optical fiber network are respectively provided with a set of photoelectric circuit. Each set of the photoelectric circuit includes a light source, a light switch A, a light switch B and a photoelectric sensor.

The light source emits visible light and converts electric energy into light energy.

The light switch A is positioned on one side of the optical fiber network, has an input end and a plurality of output ends, has a function of switching a transmission path of light, and can receive the visible light emitted by the light source so as to successively transmit the visible light to different optical fibers through an internal torsional micro-mirror.

The light switch B is positioned on the other side of the optical fiber network, has a plurality of input ends and an output end, has a function of switching a transmission path of light, and can successively receive the visible light transmitted by the optical fibers through an internal torsional micro-mirror so as to transmit the visible light to the photoelectric sensor.

If visible light irradiates on the photoelectric sensor, the photoelectric sensor outputs an electric signal. Otherwise, the photoelectric sensor does not output an electric signal.

Two sets of the photoelectric circuits are connected with a computer. The computer converts the received electric signal into a pulse signal in real time and compares a real-time waveform diagram with a non-damaged waveform. After processing, the computer outputs position coordinates of breaking points and judges the size of a wound according to the distribution of the breaking points.

The composite material optical fiber array for automatically identifying structural damage online, provided by the present invention, performs online flaw detection by mainly utilizing the characteristics that optical fibers easily transmit the light and the transmission loss is small. Two paths of light sources emit the visible light to the light switches A, the visible light is reflected by the torsional micro-mirrors in the light switches A, and then, the light irradiates on the optical fiber. If the material is normal, the optical fiber is not damaged, the visible light can pass through the optical fiber and irradiate on two paths of the light switches B, the visible light is reflected by the torsional micro-mirrors in the light switches B, the visible light irradiates on the photoelectric sensors, and then, the sensors output electric signals to the computer. If the material is damaged, the optical fiber here is damaged, two paths of the visible light cannot be transmitted to the photoelectric sensors, and thus, the photoelectric sensors do not output electric signals at the damaged intersection point. Subsequently, the torsional micro-mirrors in the light switches A automatically deflect for an appropriate angle, the visible light irradiates on the next optical fiber, and the above detection steps are repeated. The computer processes the received electric signals and outputs the position coordinates of the breaking points. If only one of the paths has no signal, as the crack further expands, the other crisscross optical fiber also has no signal. After processing, the coordinates of the breaking points are output by the computer and are displayed on a computer screen, and then, an equipment user determines the size of a wound according to the coordinates of the breaking points and the distribution of the breaking points, thereby providing decisions for further controlling the running of the equipment, and avoiding the loss of people's lives and properties in time.

Further, the optical fiber array for automatically identifying material damage online is made into a very thin optical fiber composite material prepreg through black resin to be cured and pasted at a detection position or embedded in a composite material, the relative positions of all components can be fixed, and visible light transmission is not confused.

Further, the optical fiber array is pasted at a stress concentration position of a main bearing part or an important part, or a position of a maximum dangerous stress point, or at a position prone to fatal damage as much as possible. By installing the composite material optical fiber array for automatically identifying structural damage online at these positions, people's lives and properties can be prevented from suffering great loss.

Further, after the composite material optical fiber array automatically detects an optical fiber online, the torsional micro-mirrors in the light switch A and the light switch B automatically deflect for an appropriate angle at the same time, and the light irradiates on the next optical fiber to detect the integrality of the next optical fiber. A time interval between the two deflections is short, and the two deflections are synchronized and controlled by the computer.

Further, the torsional micro-mirror is composed of a base, electrodes, a micro-mirror surface, a torsional beam and fixed supports. The micro-mirror surface is installed on the torsional beam symmetrically. Two ends of the torsional beam are disposed above the base through two of the fixed supports. Upper electrode plates are disposed on a bottom surface of the micro-mirror surface. Lower electrode plates are disposed on a top surface of the base. The upper electrode plates and the lower electrode plates are corresponding up and down. A deflection angle of the torsional micro-mirror is adjusted by controlling the electric field intensity between the upper and lower electrode plates on two sides of the micro-mirror, thereby realizing the switching of the visible light between different optical fibers. A driving moment formed by an electrostatic force enables the mirror surface of the micro-mirror to rotate around the torsional beam so as to change a path of reflected light. The torsional micro-mirrors in the light switch A and the light switch B are in synchronous torsion.

Further, a metal reflecting layer is sputtered on an upper surface of the micro-mirror surface, the inside of the micro-mirror surface is made of polycrystalline silicon, two sides of the micro-mirror surface are supported by the torsional beam, and light metal strips are paved on a lower surface of the micro-mirror surface.

Further, the electrodes and the metal strips of the micro-mirror surface can form an electrostatic field to generate the driving moment.

Further, the optical fibers are distributed in a grid shape, and extremely fine optical fibers are used during paving instead of optical fibers with coarse diameters.

Further, the photoelectric sensor respectively detects the visible light in the X and Y directions simultaneously, and two photoelectric sensors are disposed in the same optical fiber array.

Further, the optical fiber array is made into a composite material optical fiber prepreg to be cured and pasted at a detection position or embedded in a composite material. When the optical fiber array is completely pasted at the detection position, the optical fiber array is generally not damaged. At this time, the computer receives pulse waveforms generated by the photoelectric sensors and records the two pulse waves as a reference waveform.

Further, during the detection using the optical fiber array, the computer compares and analyzes the newly generated waveform with the reference waveform. If the high potential of the newly generated waveform is missing somewhere, the corresponding optical fiber here is broken, and the computer can output the coordinates of a damaged point or the position of a damaged optical fiber.

A use method of the composite material optical fiber array for automatically identifying structural damage online includes the following specific steps:

(1) turning on the power, and automatically identifying material damage on equipment online by the present invention;

(2) displaying a damage position by a computer; and (3) if the equipment is not damaged, continuing to work, and if the damage of the material structure of the equipment is obvious, outputting the coordinates of a damaged point or the position of a damaged optical fiber by the computer, so as to repair the damaged point or the damaged optical fiber immediately.

The present invention has the following beneficial effects:

The composite material optical fiber array for automatically identifying structural damage online, provided by the present invention, is pasted at a stress concentration position of a main bearing part or an important part, or a position of a maximum dangerous stress point, or at a position prone to fatal damage as much as possible. The composite material optical fiber array for automatically identifying structural damage online is installed at these positions to perform online flaw detection on structural materials in real time. After processing, the computer outputs the coordinates of breaking points and can identify the damage position and the size of a wound online, the result is displayed on a computer screen, and then, an equipment user provides decisions for further controlling the running state of the equipment according to the damage degree, so as to avoid the loss of people's lives and properties in time. The present invention is simple and convenient in operation and stable and reliable in running.

BRIEF DESCRIPTION OF THE DRAWINGS

The accompanying drawings constituting a part of the present invention are used for providing further understanding for the present invention. Exemplary embodiments of the present invention and descriptions thereof are used for explaining the present invention and do not constitute an improper limitation to the present invention.

In the figures, in order to display the position of each of the parts, the distance or size between the parts is expanded, and the schematic diagrams are for illustrative purposes only. a) denotes a basic structural material or/and composite material, b) denotes an optical fiber array, 1) denotes a light switch A, 2) denotes a light source, 3) denotes an optical fiber network, 4) denotes a light switch B, 5) denotes a photoelectric sensor, 6) denotes a computer, 7) denotes a micro-mirror surface, 8) denotes a torsional beam, 9) denotes a fixed support, 10) denotes an upper electrode plate, 11) denotes a lower electrode plate, and 12) denotes a base.

DETAILED DESCRIPTION

It should be noted that the following detailed descriptions are all exemplary, and are intended to provide a further understanding of the present invention. Unless otherwise specified, all technical and scientific terms used herein have the same meaning as commonly understood by those of ordinary skill in the art to which the present invention belongs.

It should be noted that terms used herein are only for describing specific implementations, and are not intended to limit exemplary implementations according to the present invention. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

As described in the related art, in order to maintain the equipment, and ensure the normal work of the equipment, logistics personnel need to perform non-destructive flaw detection regularly. Common non-destructive flaw detection methods include: X-ray flaw detection, ultrasonic flaw detection, magnetic powder flaw detection, permeation flaw detection, eddy current flaw detection, and γ-ray flaw detection, etc. These non-destructive flaw detection methods are only performed after the equipment has run for a long time, it is impossible to find equipment damage in a complicated environment immediately, and it is not known in advance where the damage is, so that it is necessary to detect the entire surface. It takes a lot of time and effort to realize large-area manual detection of the equipment. If there is no special condition after passing the detection, the equipment should work until the next detection and maintenance time point. Working in the complicated environment, the equipment may be damaged at any time, and the damage degree of the structure cannot be found in time, which will cause great harm to the personnel and equipment.

Figure 1:
FIG. 1 shows a pasting structure of a composite material optical fiber array on a material surface.
Figure 2:
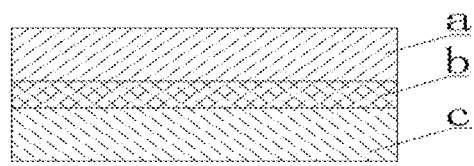
FIG. 2 shows an optical fiber array prepreg embedded and cured in a composite material.
Figure 3:
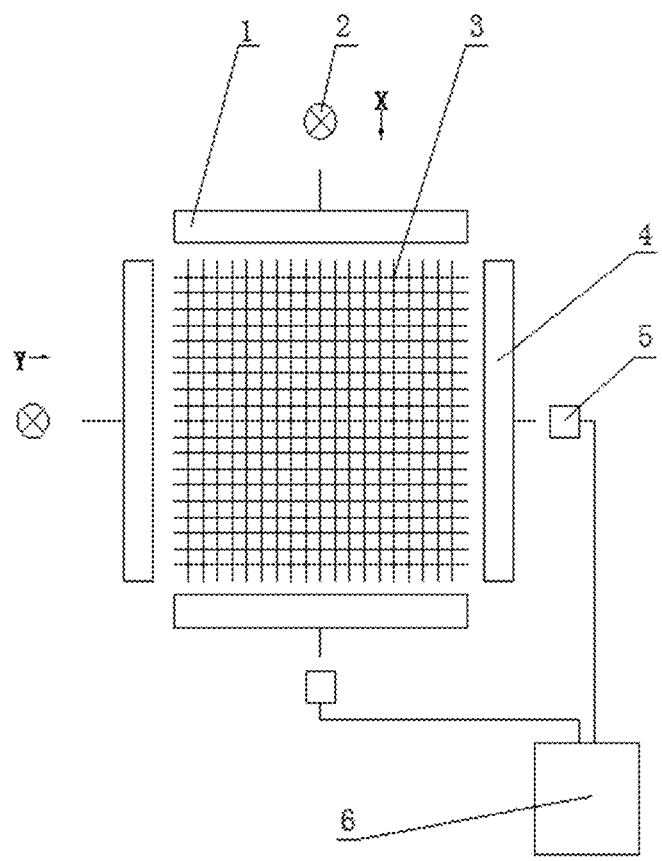
FIG. 3 shows the principle of online damage identification of the composite material optical fiber array.
Figure 4:
FIG. 4 shows a computer-generated waveform in a non-damaged state.
Figure 5:
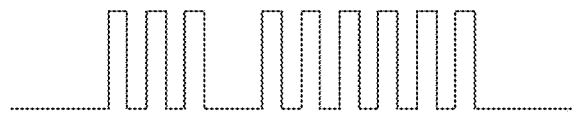
FIG. 5 shows a generated waveform in a damaged state.
Figure 6:
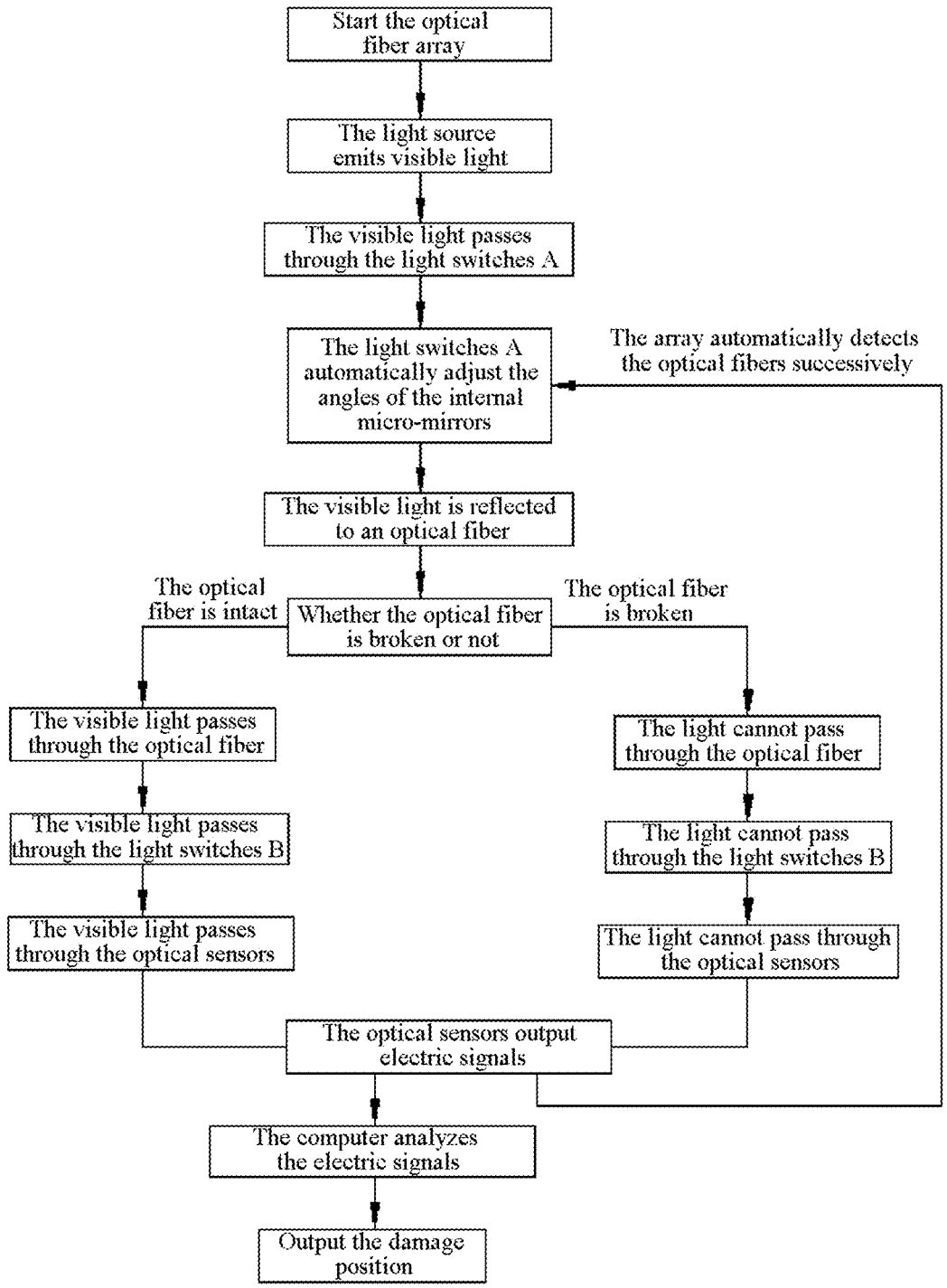
FIG. 6 shows a working flow of online damage identification of the composite material optical fiber array.
Figure 7:
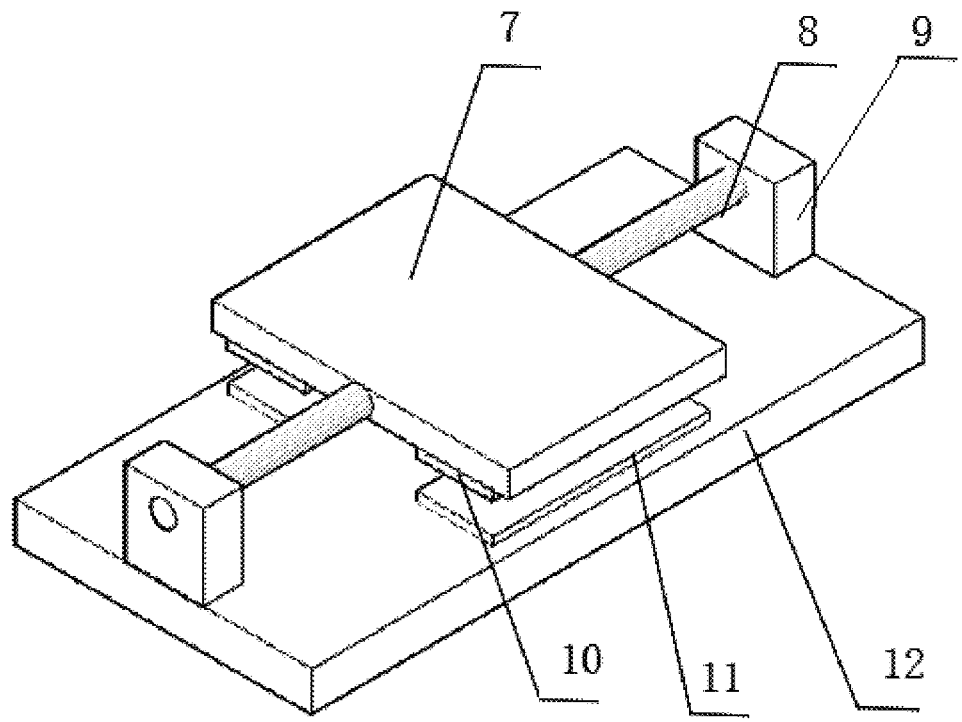
FIG. 7 shows a structure of a light switch A and a light switch B.
Figure 8:
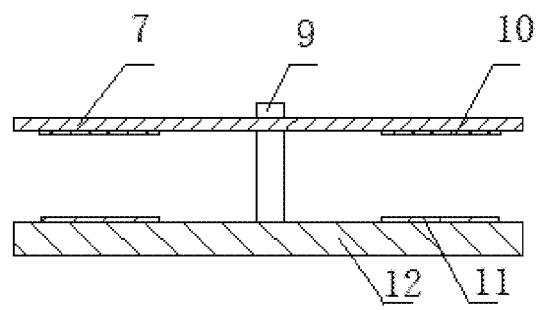
FIG. 8 shows a balanced position of a micro-mirror of a light switch.
Figure 9:
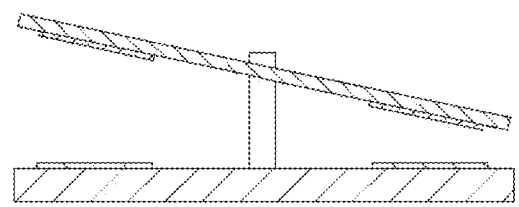
FIG. 9 shows clockwise deflection of the micro-mirror of the light switch.
Figure 10:
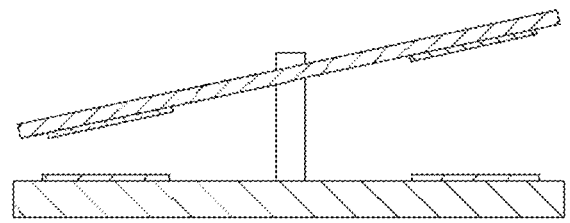
FIG. 10 shows counterclockwise deflection of the micromirror of the light switch.

The present invention is further described below with reference to the accompanying drawings 1 to 10 of the specification and specific embodiments:

FIG. 1 shows a pasting structure of a composite material optical fiber array on a material surface. FIG. 2 shows a curing structure of the optical fiber array in a composite material. FIG. 3 shows the principle of online damage identification of the composite material optical fiber array. FIG. 4 shows a computer-generated waveform in a non-damaged state. FIG. 5 shows a generated waveform in a damaged state. FIG. 6 shows a working flow of online damage identification of the composite material optical fiber array. FIG. 7 shows a structure of a light switch A and a light switch B. FIG. 8 shows a balanced position of a micro-mirror of a light switch. FIG. 9 shows clockwise deflection of the micro-mirror of the light switch. FIG. 10 shows counterclockwise deflection of the micro-mirror of the light switch. Here, a) denotes a basic structural material or/and composite material, b) denotes an optical fiber array, 1) denotes a light switch A, 2) denotes a light source, 3) denotes an optical fiber network, 4) denotes a light switch B, 5) denotes a photoelectric sensor, 6) denotes a computer, 7) denotes a micro-mirror surface, 8) denotes a torsional beam, 9) denotes a fixed support, 10) denotes an upper electrode plate, 11) denotes a lower electrode plate, and 12) denotes a base.

The present invention provides an optical fiber array for automatically identifying material damage online by utilizing the characteristics that optical fibers are relatively brittle in texture and easily transmit light. The optical fiber array is made into a composite material optical fiber prepreg through resin and is cured and pasted at a detection position or embedded in a composite material. The optical fiber array is pasted at a stress concentration position of a main bearing part or an important part, or a position of a maximum dangerous stress point, or at a position prone to fatal damage as much as possible. The optical fiber array for automatically identifying structural material damage online is installed at these positions. The optical fiber array mainly uses the light source, the light switch A, the composite material optical fiber network, the light switch B, the photoelectric sensor and the computer. If the material is damaged, the optical fiber near the material is also damaged, and the optical fiber cannot transmit light, so that a damage position and the size of a wound are identified online in real time, and the result is displayed on a computer screen.

In the present embodiment, extremely thin optical fibers are arranged in an array b and are divided into X and Y directions perpendicular to each other. The distance between the two optical fibers is about 3 mm. The optical fibers are paved in a grid shape to form an optical fiber network 3. Longer optical fibers around grids are introduced into the inner space of the equipment in sequence. Certainly, it is not difficult to understand that in other embodiments, an included angle between the optical fibers in the X direction and the optical fibers in the Y direction may also be set to be non-90° but greater than 0° and less than 180°. All of the optical fibers in the X direction are parallel, and all of the optical fibers in the Y direction are perpendicular or (oblique) to all of the optical fibers in the X direction.

Specifically, FIG. 1 shows that the made composite material optical fiber array prepreg is cured and pasted at a detection position of a basic structural material a. FIG. 2 shows that the made optical fiber array prepreg is embedded and cured in the composite material. A head end of the optical fiber network 3 is found. One light switch A is installed in the X direction, another light switch A is installed in the Y direction, and the angles of torsional micro-mirrors in the light switches are adjusted. A light source 2 is respectively installed near each of the two light switches A. A tail end of the optical fiber network 3 is found. One light switch B is installed in the X direction, another light switch B is installed in the Y direction, and the angles of torsional micro-mirrors in the light switches B are adjusted. Photoelectric sensors 5 are respectively installed in the X direction and the Y direction. The photoelectric sensors 5 are positioned near the output ends of the light switches B. The photoelectric sensors 5 in the X direction and the Y direction are connected to a computer respectively through wires. The specific connection principle of the optical fiber array is shown in FIG. 3.

The light source 2 emits visible light and converts electric energy into light energy.

The light switch A has an input end and a plurality of output ends, has a function of switching a transmission path of light, and can receive the visible light emitted by the light source so as to successively transmit the visible light to different optical fibers through an internal torsional micro-mirror.

The light switch B has a plurality of input ends and an output end, has a function of switching a transmission path of light, and can successively receive the visible light transmitted by the optical fibers through an internal torsional micro-mirror so as to transmit the visible light to the photoelectric sensor.

If visible light irradiates on the photoelectric sensor, the photoelectric sensor outputs an electric signal. Otherwise, the photoelectric sensor does not output an electric signal. The specific details are shown in FIG. 4 and FIG. 5.

The computer converts the received electric signal into a pulse signal in real time and compares a real-time waveform diagram with a non-damaged waveform. After processing, the computer outputs position coordinates of breaking points and judges the size of a wound according to the distribution of the breaking points.

Further, during actual operation, the optical fiber array is pasted at the stress concentration position of the main bearing part or the important part, or a position of the maximum dangerous stress point, or at the position prone to fatal damage as much as possible. By installing the composite material optical fiber array for automatically identifying structural damage online at these positions, people's lives and properties can be prevented from suffering great loss.

Further, after the composite material optical fiber array automatically detects an optical fiber online, the torsional micro-mirrors in the light switch A and the light switch B automatically deflect for an appropriate angle at the same time, and the light irradiates on the next optical fiber to detect the integrality of the next optical fiber. A time interval between the two deflections is short, and the two deflections are synchronized and controlled by the computer. The specific working flow is shown in FIG. 6.

Specifically, the symmetrical structure and working principle of the torsional micro-mirror are shown in FIG. 7, FIG. 8, FIG. 9 and FIG. 10. The torsional micro-mirror is composed of the micro-mirror surface 7, the torsional beam 8, the fixed supports 9, the upper electrode plates 10, the lower electrode plates 11 and the base 12. The micro-mirror surface 7 is installed on the torsional beam 8. Two ends of the torsional beam 8 are disposed above the base 12 through two of the fixed supports 9. The upper electrode plates 10 are disposed on a bottom surface of the micro-mirror surface 7. The lower electrode plates 11 are disposed on a top surface of the base 12. The upper electrode plates 10 and the lower electrode plates 11 are corresponding up and down. A deflection angle of the torsional micro-mirror is adjusted by controlling the electric field intensity between the upper and lower electrode plates on two sides of the micro-mirror, thereby realizing the switching of the visible light between different optical fibers.

A driving moment formed by an electrostatic force enables the mirror surface of the micro-mirror to rotate around the torsional beam so as to change a path of reflected light. The torsional micro-mirrors in the light switch A and the light switch B are in synchronous torsion. A metal reflecting layer is sputtered on an upper surface of the micro-mirror surface. The inside of the micro-mirror surface is made of polycrystalline silicon. Two sides of the micro-mirror surface are supported by the torsional beam. Light metal strips are paved on a lower surface of the micro-mirror surface. The electrodes and the metal strips of the micro-mirror surface can form an electrostatic field to generate the driving moment.

Further, the optical fibers are distributed in a grid shape, and extremely fine optical fibers are used during paving instead of optical fibers with coarse diameters.

During the detection using the composite material optical fiber array, the computer compares and analyzes the newly generated waveform with the reference waveform. If the high potential of the newly generated waveform is missing somewhere, the corresponding optical fiber here is broken, and the computer can output the coordinates of a damaged point or the position of a damaged optical fiber. The optical fiber array is coated with extremely thin black epoxy resin so as to be made into a very thin composite material optical fiber array prepreg to be cured and pasted at the detection position of the basic structural material a or embedded in the composite material. When the paving of the material and the optical fiber array is completed just, there is no load and no damage. At this time, the computer 6 receives the waveform generated by the photoelectric sensor in the X direction/Y direction, and the computer records these two pulse waves as the reference waveform. The specific details are shown in FIG. 4. If the basic structural material a is damaged and the optical fibers on some grid points of the optical fiber array cannot transmit light, the computer 6 receives the waveforms generated by the photoelectric sensors in the X direction and the Y direction. The specific details are shown in FIG. 5. The intersection points of the optical fibers in the X direction and the Y direction corresponding to the missing pulse waveforms are the position coordinates of the damage. A use mode of the composite material optical fiber array for automatically identifying material damage online, provided by the present embodiment, is as follows.

After confirming that the present invention is in a working state, the optical fiber array performs automatic detection, the computer automatically processes information, and a user only needs to receive the information before the computer 6.

The internal working processes of the composite material optical fiber array for automatically identifying material damage online, provided by the present embodiment, are as follows.

The light source 2 emits visible light, the visible light is reflected by the light switches A, and then, the visible light irradiates on the optical fiber array network 3.

If the material is normal, the optical fiber is not damaged, the visible light passes through the optical fiber 3 and irradiates on the light switches B, the visible light is reflected by the torsional micro-mirrors in the light switches B, the visible light irradiates on the photoelectric sensors 5, and then, the sensors 5 output electric signals to the computer 6.

If the material is damaged, the optical fiber here is damaged, the visible light cannot be transmitted to the photoelectric sensors 5, and thus, the photoelectric sensors 5 do no output electric signals.

After the composite material optical fiber array automatically detects an optical fiber, the light switches A automatically deflect for an appropriate angle, and the light irradiates on the next optical fiber to detect the integrality of the next optical fiber. All electric signal state changes of the photoelectric sensors 5 are recorded in the computer.

The computer 6 compares the received new pulse waveform with the reference waveform. If the newly generated pulse waveform is missing, after processing, the computer outputs the coordinates of the breaking points. The specific processes are shown in FIG. 6.

The composite material optical fiber array for automatically identifying structural material damage online, provided by the present embodiment, performs online flaw detection by mainly utilizing the characteristics that optical fibers easily transmit the light and the transmission loss is small. Two paths of light sources emit the visible light to the light switches A, the visible light is reflected by the torsional micro-mirrors in the light switches A, and then, the light irradiates on the optical fiber. If the material is normal, the optical fiber is not damaged, the visible light can pass through the optical fiber and irradiate on two paths of the light switches B, the visible light is reflected by the torsional micro-mirrors in the light switches B, the visible light irradiates on the photoelectric sensors, and then, the sensors output electric signals to the computer. If the material is damaged, the optical fiber here is damaged, two paths of the visible light cannot be transmitted to the photoelectric sensors, and thus, the photoelectric sensors do not output electric signals at the damaged intersection point. Subsequently, the torsional micro-mirrors in the light switches A automatically deflect for an appropriate angle, the visible light irradiates on the next optical fiber, and the above detection steps are repeated. The computer processes the received electric signals and outputs the position coordinates of the breaking points. If only one of the paths has no signal, as the crack further expands, the other crisscross optical fiber also has no signal. After processing, the coordinates of the breaking points and the position of the path of optical fiber having no signal are output by the computer and are displayed on a computer screen, and then, an equipment user determines the size of a wound according to the coordinates of the breaking points and the distribution of the breaking points, thereby providing decisions for further controlling the running of the equipment, and avoiding the loss of people's lives and properties in time.

The foregoing descriptions are merely exemplary embodiments rather than all the embodiments of the present invention, but are not intended to limit the present invention. Any modification, equivalent replacement, or improvement made within the spirit and principle of the present invention shall fall within the protection scope of the present invention.

Except the technical features described in this specification, all other features are known to those skilled in the art, and to highlight the innovative features of the present invention, the foregoing technical features are not described herein again.

What is claimed is:

1. A composite material optical fiber array for automatically identifying structural material damage online, comprising:
   an optical fiber network composed of an optical fiber array, wherein a plurality of optical fibers are distributed in a grid shape and are divided into X and Y directions perpendicular or oblique to each other, all of the optical fibers in the X direction are parallel, and all of the optical fibers in the Y direction are perpendicular or oblique to all of the optical fibers in the X direction;
   the X direction and the Y direction of the optical fiber network are respectively provided with a set of photoelectric circuit; each set of the photoelectric circuit comprises a light source, a light switch A, a light switch B and a photoelectric sensor;
   the light source emits visible light and converts electric energy into light energy;
   the light switch A is positioned on one side of the optical fiber network, has an input end and a plurality of output ends, has a function of switching a transmission path of light, and can receive the visible light emitted by the light source so as to successively transmit the visible light to different optical fibers through an internal torsional micro-mirror;
   the light switch B is positioned on the other side of the optical fiber network, has a plurality of input ends and an output end, has a function of switching a transmission path of light, and can successively receive the visible light transmitted by the optical fibers through an internal torsional micro-mirror so as to transmit the visible light to the photoelectric sensor;
   if visible light irradiates on the photoelectric sensor, the photoelectric sensor outputs an electric signal; otherwise, the photoelectric sensor does not output an electric signal; and
   two sets of the photoelectric circuits are connected with a computer, the computer converts the received electric signal into a pulse signal in real time and compares a real-time waveform diagram with a non-damaged waveform, and after processing, the computer outputs position coordinates of breaking points and judges the size of a wound according to the distribution of the breaking points.

2. The composite material optical fiber array for automatically identifying structural material damage online according to claim 1, wherein the optical fiber array is made into a very thin composite material optical fiber prepreg through black resin to be cured and pasted at a detection position or embedded in a composite material.

3. The composite material optical fiber array for automatically identifying structural material damage online according to claim 1, wherein the optical fiber array is pasted at a stress concentration position of a main bearing part or an important part, or a position of a maximum dangerous stress point, or at a position prone to fatal damage.

4. The composite material optical fiber array for automatically identifying structural material damage online according to claim 1, wherein the torsional micro-mirror is composed of a base, electrodes, a micro-mirror surface, a torsional beam and fixed supports; the micro-mirror surface is installed on the torsional beam, two ends of the torsional beam are disposed above the base through two of the fixed supports, upper electrode plates are disposed on a bottom surface of the micro-mirror surface, lower electrode plates are disposed on a top surface of the base, and the upper electrode plates and the lower electrode plates are corresponding up and down; a driving moment formed by an electrostatic force enables the mirror surface of the micro-mirror to rotate around the torsional beam so as to change a path of reflected light; and the torsional micro-mirrors in the light switch A and the light switch B are in synchronous torsion.

5. The composite material optical fiber array for automatically identifying structural material damage online according to claim 4, wherein a metal reflecting layer is sputtered on an upper surface of the micro-mirror surface, the inside of the micro-mirror surface is made of polycrystalline silicon, two sides of the micro-mirror surface are supported by the torsional beam, and light metal strips are paved on a lower surface of the micro-mirror surface.

6. The composite material optical fiber array for automatically identifying structural material damage online according to claim 4, wherein the electrodes and metal strips of the micro-mirror surface can form an electrostatic field to generate the driving moment.

7. The composite material optical fiber array for automatically identifying structural material damage online according to claim 4, wherein after the optical fiber array automatically detects an optical fiber online, the torsional micro-mirrors in the light switch A and the light switch B automatically deflect for an appropriate angle at the same time, and the light irradiates on the next optical fiber to detect the integrality of the next optical fiber; and a time interval between the two deflections is short, and the two deflections are synchronized and controlled by the computer.

* * * * *